United States Patent [19]

Macedo et al.

[11] Patent Number: 5,188,649
[45] Date of Patent: Feb. 23, 1993

[54] PROCESS FOR VITRIFYING ASBESTOS CONTAINING WASTE, INFECTIOUS WASTE, TOXIC MATERIALS AND RADIOACTIVE WASTE

[75] Inventors: Pedro B. Macedo, 6100 Highboro Dr., Bethesda, Md. 20817; Robert K. Mohr, Washington, D.C.

[73] Assignees: Pedro Buarque de Macedo, Bethesda; Theodore Aaron Litovitz, Annapolis, both of Md.

[21] Appl. No.: 741,301

[22] Filed: Aug. 7, 1991

[51] Int. Cl.⁵ .................. C03B 5/187; C03B 19/10
[52] U.S. Cl. ........................... 65/21.3; 65/27; 65/134; 65/136; 65/178; 501/155
[58] Field of Search ............. 65/21.2, 21.3, 27, 134, 65/136, 178; 501/155

[56] References Cited

U.S. PATENT DOCUMENTS

| | | |
|---|---|---|
| Re. 15,727 | 12/1923 | Crossley . |
| 1,069,255 | 8/1913 | Heroult . |
| 1,394,973 | 10/1921 | Crossley . |
| 1,454,082 | 5/1923 | Schlosser . |
| 1,822,705 | 9/1931 | Mambourg . |
| 2,254,079 | 8/1941 | McAlpine . |
| 2,274,643 | 3/1942 | Adams . |
| 2,531,612 | 11/1950 | Crochet et al. . |
| 3,025,385 | 3/1962 | Tanaka .................. 219/50 |
| 3,161,600 | 12/1964 | Barton . |
| 3,232,731 | 2/1966 | Malicheff .................. 65/27 |
| 3,321,409 | 8/1968 | Grover et al. ........... 252/301.1 |
| 3,397,972 | 8/1968 | Brichard et al. ................ 65/27 |
| 3,573,940 | 4/1971 | Cockrell et al. . |
| 3,647,405 | 3/1972 | Smith ............................ 65/19 |
| 3,811,860 | 5/1974 | Nier ......................... 65/178 X |
| 3,880,629 | 4/1975 | Dulin et al. .................... 65/27 |
| 3,907,956 | 9/1975 | Meunier ...................... 264/117 |
| 3,942,966 | 3/1976 | Kroyer et al. .................. 65/33 |
| 3,956,076 | 5/1976 | Powell et al. ............. 65/21.2 X |
| 3,976,829 | 8/1976 | Wiebke et al. . |
| 4,020,004 | 4/1977 | Schulz et al. ............. 252/301.1 |
| 4,065,281 | 12/1977 | Byrne ............................. 65/19 |
| 4,065,282 | 12/1977 | Morey ........................... 65/28 |
| 4,110,097 | 8/1978 | Chevallier et al. ............ 65/136 |
| 4,139,360 | 2/1979 | Piper ............................ 65/134 |
| 4,191,546 | 3/1980 | Kroyer ........................... 65/20 |
| 4,224,177 | 9/1980 | Macedo et al. ............. 252/301.1 |
| 4,225,332 | 9/1980 | Tsay ............................. 65/134 |
| 4,297,304 | 10/1981 | Scheffler et al. .............. 264/0.5 |
| 4,299,611 | 11/1981 | Penberthy ....................... 65/27 |

(List continued on next page.)

FOREIGN PATENT DOCUMENTS 244358 12/1925 United Kingdom .

OTHER PUBLICATIONS

Mechanical Engineering, Sep. 1988, pp. 70–75, Hazardous Waste: Where to Put It? Where Will It Go? Sather.

Primary Examiner—Robert L. Lindsay
Attorney, Agent, or Firm—Jacobson, Price, Holman & Stern

[57] ABSTRACT

Material, such as, for example, sealed double bags of asbestos containing waste or ash from infectious waste or toxic material or radioactive waste, is transferred into a glass melt of a furnace. Gas bubbles released into the melt form a gas curtain which causes enhanced mixing of the material to accelerate the dissolution of the components of the added material. The presence of the gas bubbles reduces the cross-section of the molten glass through which current passes, which in turn increases the electrical resistance of the glass melt and therefore increases power generation of the melt or power density at constant current. A highly oxidizing hot region is produced under the location where the material is introduced into the furnace. Drawn off glass is shaped and quenched into at least two sizes of approximate spheres. The spheres are cooled sufficiently fast to be thermally tempered and have a surface compressive strength level above 5000 psi.

56 Claims, 5 Drawing Sheets

U.S. PATENT DOCUMENTS

| | | | |
|---|---|---|---|
| 4,309,204 | 1/1982 | Brooks | 65/28 |
| 4,313,747 | 2/1982 | Barton | 65/27 |
| 4,321,075 | 3/1982 | Ilk et al. | 65/27 |
| 4,353,725 | 10/1982 | Hohman et al. | 65/27 |
| 4,376,070 | 3/1983 | Pope et al. | 252/629 |
| 4,414,013 | 11/1983 | Connell | 65/136 X |
| 4,422,862 | 12/1983 | Wardlaw | 65/28 |
| 4,424,149 | 1/1984 | Bege et al. | 252/629 |
| 4,430,108 | 2/1984 | Hojaji et al. | 65/22 |
| 4,468,473 | 8/1984 | Drolet et al. | 501/155 |
| 4,627,069 | 12/1986 | Harvey et al. | 373/29 |
| 4,632,690 | 12/1986 | Colwell et al. | 501/155 X |
| 4,634,461 | 1/1987 | Demarest, Jr. et al. | 65/27 |
| 4,635,570 | 1/1987 | Ewest et al. | 65/27 X |
| 4,666,490 | 5/1987 | Drake | 65/134 X |
| 4,678,493 | 7/1987 | Roberts et al. | 65/134 |
| 4,696,691 | 9/1987 | Lawhon et al. | 65/27 |
| 4,764,216 | 8/1988 | Hooykaas | 501/155 X |
| 4,782,497 | 11/1988 | Sasaki et al. | 373/29 |
| 4,820,328 | 4/1989 | Roberts et al. | 65/134 |
| 4,831,943 | 5/1989 | Aune | 110/346 |
| 4,855,082 | 8/1989 | Duivelaar | 252/629 |
| 4,906,409 | 3/1990 | Leister | 252/629 |
| 4,915,039 | 4/1990 | Ringel | 110/346 |
| 4,944,785 | 7/1990 | Sorg et al. | 65/136 |
| 4,957,527 | 9/1990 | Hnat | 65/19 |
| 4,977,837 | 12/1990 | Roos et al. | 110/165 A |
| 4,988,376 | 1/1991 | Mason et al. | 65/134 |
| 4,997,485 | 3/1991 | Lamoni | 65/21.3 X |
| 5,022,329 | 6/1991 | Rackley et al. | 110/234 |
| 5,035,735 | 7/1991 | Pieper et al. | 65/134 |
| 5,041,398 | 8/1991 | Kauser et al. | 501/27 |
| 5,052,312 | 10/1991 | Rackley et al. | 110/346 |

PROCESS FOR VITRIFYING ASBESTOS CONTAINING WASTE, INFECTIOUS WASTE, TOXIC MATERIALS AND RADIOACTIVE WASTE

FIELD OF THE INVENTION

This invention relates to a process for vitrifying material such as asbestos containing waste, ash of infectious waste produced from bags of medical waste, toxic materials and radioactive waste, wherein bags of asbestos containing waste, ash of infectious waste, toxic materials or low level radioactive waste are introduced into a glass melt furnace. Exiting glass is quenched in a marble making machine to produce a filler material.

BACKGROUND OF THE INVENTION

Asbestos and asbestos containing materials (ACM), once considered a "miracle mineral" in the insulation industry, are now controversial due to their link with respiratory diseases. A survey by the U.S. Environmental Protection Agency (E.P.A.) estimates that asbestos is present in more than 30,000 public schools and 730,000 public or commercial buildings.

In the United States an industry has developed to remove offending asbestos. The Department of Labor's Occupational Safety and Health Administration (O.S.H.A.) has established strict regulations for the handling and the disposal of the waste products produced by the asbestos abatement industry.

Asbestos is a range of complex silicates which break down when subjected to temperatures in the range of 400° to 900° C. The process of breaking down of the fibrous structure also destroys the toxicity of the material. Heat treatment is therefore a logical approach to make asbestos-containing waste permanently non-toxic.

The disposal of medical wastes is a major environmental and public health problem. Medical wastes include microbiological wastes, pathological wastes, sharps, such as syringe needles, animal wastes, bedding and patient clothing, surgical wastes, dialysis unit wastes and other contaminated patient care and laboratory objects. Over 10,000 tons of hospital waste are generated daily in the United States alone.

Major current solutions to the medical waste problem include incineration and burial in landfills. Landfilling without prior treatment poses serious hazards of leakage and contamination of the environment. Incineration is the most widely used method of treating medical waste prior to burial.

Problems with conventional incinerators include air pollution due to particulate emission and the generation of large volumes of potentially toxic ash, which must be placed in a landfill. This ash contains large quantities of toxic metals, such as chromium, which can be subsequently leached from the buried ash by the action of groundwater and contaminate water sources. Ash may also contain incompletely oxidized carbonaceous matter which is potentially carcinogenic, and may even include surviving pathogens as a result of incomplete incineration. Incinerator emissions may be contaminated with surviving pathogens, in particular spore-forming bacteria, as well as organics, carbon monoxide, particulate matter, and acid gases.

Other methods for the treatment of medical wastes, such as sterilization by means of autoclaving or microwaving, do not offer means of dealing with sharps and immobilizing toxic metals. In addition, these methods, unlike incineration, are inapplicable to a large fraction of medical wastes, since they cannot solve the problem of disposal of pathological wastes such as human and animal body parts and are unsuitable for use with large contaminated objects. Accordingly, no completely satisfactory methods for the management of medical wastes are available at the present time.

There are also large volumes of toxic materials including contaminated soils, sludges, ash, mine tailings, etc. which cannot be readily warehoused in landfills, because there is no guarantee that they will be contained within the landfill and not leak out. These toxic wastes must be immobilized so as not to be dispersed into the environment. In addition, heavy metals, pathological vectors, pesticides, pcbs and radioactive materials can be transported from a landfill into drinking water by movement of ground water. Humans and animals may disturb a soil cap over the waste contained within a landfill, thus permitting the dispersion of the waste by wind or rain.

Vitrification has been chosen by the EPA as the best "demonstrated available technology" for high level nuclear waste, which is far more hazardous than toxic wastes. However, due to the volume of toxic wastes as compared to high level nuclear waste, it is too expensive to do extensive pretreatments to toxic waste or low level nuclear waste. Thus, there is a need to develop a robust vitrification process which can accommodate asbestos materials, ash of infectious waste, toxic materials and low level radioactive waste, which is described in the present invention.

In order to design a heat treatment process for asbestos containing waste, infectious waste ash, toxic materials and low level radioactive waste several strict standards for vitrification must be established. Such standards would necessitate that the asbestos containing waste, ash of infectious waste, toxic materials and low level radioactive waste be rendered non-toxic, or environmentally stable. The process itself also must be intrinsically safe in operation, capable of handling most forms of ACM (asbestos and associated materials), infectious waste, toxic materials, low level, TRU (transuranic waste), and high level radioactive waste, and be simple to operate.

The ACM may include pipe insulation, boiler gaskets, ceiling tile, floor tile, plaster, roofing materials, brake linings, blown insulation, wire, other reinforcing materials and any items contaminated with asbestos during asbestos abatement projects.

U.S. Pat. No. 4,678,493 and U.S. Pat. No. 4,820,328, both to Roberts et al. disclose methods of vitrification of asbestos waste. In these patents, the raw material, in this case asbestos, is placed in silos and mixed with other batch materials, such as cullet, alkalis and other fluxes. If necessary, the materials are first ground together and transferred to a furnace by a screw drive, or other means. The mixture of asbestos and other materials is fed to an electrical glass melting furnace and discharged above a body of molten glass. Premixing of the batch ingredients before melting, can in many cases cause considerable problems. Especially if the waste has cementation properties, such as in asbestos containing waste, large clumps of waste can bind together which may disrupt the feed system by jamming it.

U.S. Pat. No. 4,820,328 to Roberts et al. specifically teaches the use of an electrical furnace with temperatures preferably in the range of 1350°–1380° C., corresponding to a temperature of about 1250° C. at the top of the molten glass. This usually requires Molybdenum electrodes, which limit the amount of oxidation potential of the melt. If the asbestos includes associated iron parts such as chicken wire or other reinforcing materials, the iron parts will not be readily consumed in a Molybdenum electrode glass furnace.

It is known that certain alkali salts, especially sulfates and chlorides such as $Na_2SO_4$, $NaCl$, $K_2SO_4$, $KCl$, $Li_2SO_4$, and $LiCl$, when present in a mixture of components placed in a silicate glass melter, do not form a part of the glass melt upon heating but constitute a separate liquid layer, known as the gall layer, which floats on top of the heavier silicate melt. The same phenomenon occurs when alkaline earth salts, such as $CaSO_4$, $CaCl_2$, $MgSO_4$, and $MgCl_2$ are present, since these can react with alkalies and give rise to a similar gall layer. These phenomenon are described, for instance, in U.S. Pat. No. 3,499,743 to Fanica et al., or can be generated from sulfates or chlorides present in the batch of materials which require vitrification, e.g. incinerator ash, asbestos containing waste, certain toxic materials (many sludges are high in sulfate) and possibly low level radioactive waste. Conventional thinking has addressed the insoluble sulfate problem by reducing it to $SO_2$ and letting the $SO_2$ escape with the off-gas. However, new regulations propounded by the EPA prevent implementation of this solution because of the acid rain problem. Further, an over oxidized batch (melt) can erupt in a foaming incident when one nucleates the first oxygen bubbles. In Fanica et al., at least one rod electrode is present in this gall layer. This structure requires current across the electrodes which would rapidly degrade the electrodes. The very high current densities needed are uneconomical for the power supply.

Sorg et al. (U.S. Pat. No. 4,944,785) describes a process of using such gall layers to decompose or absorb residual hazardous components from the gas emitted by the melter. The process described by Sorg et al. makes use of high temperatures in the glass melt ranging around 1400° C., which cause a substantial amount of the sulfates and chlorides to decompose and be emitted into the exhaust gas, mainly in the form of HCl and $SO_2$. This exhaust gas is cooled to cause condensation and the condensation products are reintroduced into the batch to be melted or completely removed from the system. This limits the growth of the gall layer during continuous operation of the glass melter.

The gall layer has a much higher specific conductivity than the molten silicate. Thus, if the gall layer touches or is close to the electrodes it will effectively short them. For a given voltage difference between electrodes, the current density near or at the gall layer will be very high. In order to prevent excessive corrosion in the electrodes, one must limit the current density at the electrode. To efficiently heat the glass the current should be substantially distributed within the glass layer and not be concentrated in the gall layer.

When treating nuclear waste, close control of the redox state of the batch chemicals is maintained by the addition of nitrates/hydrocarbons. For example it has been thought that by adding sugar to a melt the number and amount of foaming incidents would be reduced. This belief is based upon the theory that foaming incidents were caused by the release of oxygen when the transition elements dropped from higher oxidation states to a lower oxidation state. However, since this procedure requires the use of reducers and the nucleation of bubbles, the melter can be overoxidized. When the process starts it could be explosive, resulting in melt choking, inlet blockage and excessive off-gas.

SUMMARY OF THE INVENTION

By the present invention, in the handling of ACM, one sacrifices the most expeditious melting procedures for operator and environmental safety, by handling a major biohazard, such as ACM, in closed bags during the receiving, storage, and delivery to the furnace operation. The U.S. Department of Transportation requires that at the job site from which ACM is being removed, it must be packaged in a plastic bag. This bag must be repackaged into a second bag - double bagging.

Thus trucks arrive at the vitrification site with double bagged ACM. These bags are loaded into a container to prevent the bags from breaking at the receiving, storage, and delivery system. Alternatively, the containers are loaded at the original job site with double bagged ACM and transported by truck to the vitrification site. Once the ACM is in bags in containers at the vitrification plant, the containers will be moved from location to location. Each container may have more than one bag of ACM inside.

The containers are taken directly to a melt furnace, or taken to a storage area. The storage area will be similar to a containerized warehouse, where containers with double bagged ACM can be manually, semi-automatically or automatically handled. Receiving, storage and delivery of ACM is thereby kept clean. Therefore the precautions required for handling ACM need not apply.

The immediate feeding of double bagged ACM to a furnace versus storage of ACM in a silo, for example, prevents wet construction material containing asbestos from hardening in a silo. In a silo it is possible that the contents of ripped or shredded bags of ACM would bind together due to of the high concentration of cementitious material present which could form concrete.

Since screw feeds do not interact well with steel construction debris removed with ACM, only the non-ACM batch materials, such as alkali and/or alkaline oxide or carbonate, cullet and boron trioxide, are fed from a silo through a screw feed. The non-ACM material is under control of the vitrification operators and is purchased to be compatible with a screw feed system, while the ACM comes from the construction site in double bags and is stored in containers The containers of double bagged ACM, ash of medical waste, toxic materials or low level radioactive waste are brought to the feed area of the furnace where they are either stored in a dirty batch area, or preferably transported directly to the furnace.

In a preferred embodiment, the closed double bags of ACM are dumped directly into the glass melt of the furnace A door to the furnace will open and negative air pressure of the furnace or mechanical means will force the whole bag of ACM into the furnace. At the elevated temperatures of the furnace the plastic of the double bags or suitable container, if necessary, reaches its flash point and burns, exposing ACM directly to the glass melt. Periodically "clean" batch chemicals are added to the glass melt.

Fluxes are added to the glass melt of the furnace to permit melting at about 1150° C. (+100° C.) and to permit use of chromium alloy electrodes, such as INCONEL, which permits the operation of the melt in an oxidizing condition, by bubbling a gas, such as air or oxygen, into the melt so that the oxidizing melt will consume iron and other metal scraps. The oxidizing condition is defined by maintaining a ratio of $Fe^{3O+}/(Fe^{+++}+Fe^{++})$ of less than 0.1, and preferably less than 0.05, so that the presence of $Fe^{++}$ is less than 10% of total oxidized iron.

The gas bubbles cause enhanced mixing which avoids the need for premixing of the batch and which accelerates the dissolution of the more refractory components of the ACM, toxic materials or radioactive waste. Oxygen will burn the plastic, wood and other organic materials contained with the asbestos waste, toxic materials or radioactive material while large gas bubbles will sweep small bubbles in the melt pool, preventing uncontrolled accumulation of foam at the top of the melt and uncontrolled foaming events within the melt.

Finally and most importantly, the presence of the gas bubbles will reduce the cross section of the molten glass through which the current passes, which in turn increases the electrical resistance and therefore increases power generation or power density at constant current. This causes a highly oxidizing hot region under the position where ACM waste, ash of medical waste, toxic material or radioactive waste is introduced to the furnace, which accelerates the conversion of the magnesium and silicon together with their oxygens of the ACM to molten glass, even though the ACM is full of construction and other debris.

Unopened bags of waste, such as ACM, toxic materials or radioactive waste are added to the molten glass. The stirred (molten glass) oxidized melt acts as a powerful dissolution media. The molten glass burns the organics of the waste and in the case of ACM, boils off amended water used to saturate ACM for ease of removal and chemically bonded water. The flow of the melt in the furnace allows heavy waste such as metal, bricks etc., to slowly sink against the counter current of the hot upflow, speeding up its destruction. Lower density material will flow towards the side of the tank and down with the melt current. The melt wets the waste and increases heat transfer and chemical dissolution.

As water of hydration is rapidly released from the ACM construction materials they explode, powdering themselves without the need for mechanical grinding. Fluxes added on top of each addition of ACM maintain the average composition fluid enough so that the viscosity will be $<100$ poise @1100° C., to allow the ACM to be processed at a reasonable rate. The undiluted fluxes are more aggressive than the melt in attacking the ACM refractory parts.

Once the reaction has been taken to completion the silicates, magnesium oxide, iron oxide, aluminum oxide, sodium oxide and many more oxides will dissolve in the melt. Carbon and nitrogen and water in the organics will be discharged in the off-gas system and the sulfates will float on the top of the melt forming a scum layer of probably CaSO (depending on the ratio of $Ca^{++}/Mg^{++}$ and other cations in the melt). Typically, in an oxidizing melt about 1-2% $SO_4$ will dissolve in the melt. Up to approximately 5% is trapped in the melt as undissolved crystals, and will exit through the bottom drain outlet. Any additional $CaSO_4$ in the waste will accumulate at the top of the melt in the form of a scum layer.

If the waste contains substantial amounts of low density materials such as in the case of ACM, gypsum, dry wall, plaster (which all contain high quantities of $CaSO_4$), the scum formed by these low density materials will accumulate on the top of the furnace until it chokes the operation. Once sufficient scum has accumulated to significantly affect operation of the furnace, a cycle is started for scum removal. Feed to the furnace (both waste and other materials such as fluxes) is temporarily halted, causing the temperature at the top of the furnace to rise. It may be necessary to use roof heaters (placed above the melt line of the furnace) to accelerate the process of bringing the temperature above the melt line in the furnace above the decomposition temperature of all the waste (T>900° C.). This temperature range will destroy waste in the air and on the surface of the melt.

Once the temperature above the melt line is above the decomposition temperature for all of the waste, one can be sure that all the asbestos in the scum and plenum has been decomposed. At this point a top outlet (an output at a level approximating the melt line) is opened. This will allow for the removal of the scum on the melt. During this operation the furnace could be fed with non-waste material. Skimming the melt can be employed for greater efficiency. Once the scum removal has been accomplished, the upper outlet is closed and normal processing of waste is commenced.

In the present invention, control of sulfate levels in the glass melter is extremely important in order to minimize corrosion. Upon heating, sulfates are expected to accumulate in a supernatant gall layer. Additionally, in the present invention, the bubbling of air through the melter may promote and accelerate the separation of this layer from the main melt. In the presence of high levels of sulfates, which may amount to as much as approximately 10% of the batch composition, this layer can be expected to grow rapidly in thickness during continuous feeding and operation of the melter.

In such a case, the process described by Sorg et al. will encounter serious difficulties. Since this process is based on the use of the melter with only one outlet for the molten glass, the only way to remove sulfates and chlorides is through the decomposition and emission in the exhaust gas. When the concentrations of such species are high, this process is inherently slow and incurs very high costs, because it necessitates complete removal of large quantities of pollutants ($SO_2$, HCl) before the residual exhaust gas can be released into the environment. Furthermore, the necessity to decompose the sulfates and chlorides in order to remove them makes it imperative to operate the glass melter at very high temperatures of approximately 1400° C., resulting in shortened melter service life.

In the present invention, the melter is equipped with an extra outlet or a tube which will permit the removal of the gall layer independently of the drain used to remove molten glass out of the furnace. This will permit control of the thickness of the gall layer to prevent excessive growth, which could slow down the melting process and even damage the melter, and will make it possible to recover the gall layer separately in a liquid form without having to decompose the sulfates and chlorides present with the ensuing requirement for a very large and expensive exhaust gas purification system. Finally, this improvement makes it possible to operate the melter at relatively low temperatures, preferably between 1050° and 1250° C., thus reducing energy costs and increasing the service life of the melter.

The silica melt level is maintained such that it always covers the electrodes. The glass level is maintained such that its height above the top edge of the electrodes (including leads) is at least equal to 5% of the electrode height. If a highly conductive gall layer of some molten salt such as $Na_2SO_4$ develops and it covers the glass surface, it can act as a short between the electrodes. By maintaining the glass height at least 5% greater than the electrode height this shorting effect is reduced to a tolerable level.

The present invention makes use of Joule heating by which an electric current is passed through the melt and natural resistivity of the melt produces heat where heat is needed in the melt. Since it is desirable to have an oxidizing melt the electrodes used are limited to those which do not oxidize easily, such as platinum or high chrome alloys, and preferably INCONEL type alloys, for the electrodes. High chromium content bricks are used in glass contact regions for furnace durability.

INCONEL as well as other metals have a current per unit area limit above which significant corrosion occurs. The exact current depends on the temperature of the electrode/melt interface, redox conditions and the expected furnace life. A typical result obtained is in the range of less than 50A per square inch, preferably less than 20A per square inch, and more preferably less than 10A per square inch. Production rates for this type of furnace can be limited by the rate of power delivery to the melt.

A constant heating (power density) will result in a temperature profile shown by a parabolic curve with a maximum in the center. The higher center temperature causes the resistivity and power delivered there to drop which in turn lowers the maximum temperature. By introducing gas bubbles into the melt which are voids and which will not conduct electricity, one decreases the cross sectional area of the melt through which the current passes, thus increasing the resistance of the melt. If the power supply is arranged to be a constant current supply (rather than constant voltage), the additional resistance will increase the power density and thus the temperature and will form a highly oxidizing hot region into which the waste materials are introduced.

Thus, in order to increase the power density in the bubble containing regions, one has to have the effect of resistance in series, which is produced by a substantially complete curtain of bubbles between the electrodes. This can be accomplished by having one or more tubes located near the bottom of the furnace that have multiple orifices where gas can evolve to form at least one gas curtain. A curtain of gas bubbles produced by the tubes in the glass melt will have a volume fraction of gas ranging from 10–60%, preferably 15–40%, and more preferably 20–30%. Maximization of the rate of power delivery and an optimized temperature profile are thereby achieved. Further, the action of the bubbles will tend to cause voids in any conductive gall layer and prevent the gall layer from providing a short between the electrodes. The bubbles effectively increase the resistance of this layer if it is present and increases the power density in the glass where it is desired.

If there is a region where the bubbles occupy 33% of the volume of the melt, the power will be 50% higher and the additional temperature as well as the effective lower density of this column of glass will give the column of glass an upflow motion. At this "hot molten spring" is the location where fresh waste is added to the melt. A cold cap will be formed as the material is introduced from the top of the melt. As it sinks into the melt, the hot, highly oxidizing, highly corrosive melt will attack the waste. The waste will be oxidized with air at 1150° C. which is well above combustion temperatures. The liquid and chemically bound water will flash boil and mechanically break up the many structures of the waste. The inverse temperature gradient at the top interface (top of the melt, bottom of the cold cap) will form vortex turbulence which accelerates the attack on the waste. The melt wets the waste making the surface tension forces work for, rather than against, attack.

In addition to ACM waste, the present invention provides a method of assured and complete destruction of medical wastes and of immobilization of the products of their incineration by converting them into an inert glass. The glass product not only prevents leachings or dispersal of potentially toxic species remaining after combustion of the wastes but can be processed into aggregates of convenient sizes and shapes for use in the construction industry, for instance as fillers for concrete.

Infectious hospital waste, typically called red bag waste, containing various amounts of contaminated disposable paper products, blood and tissue materials, body parts, animal parts, sharps, contaminated instruments and other potentially infectious hospital debris is contained in plastic bags within cardboard boxes for disposal. The boxes are collected and stored at the waste generation site until picked up for transportation by truck to the waste vitrification plant. At the vitrification plant the boxes are unloaded and stored in a warehouse until they are processed.

As needed, the waste boxes are conveyed to an incinerator, which is a commercially available high efficiency two chambered combustor. Whole boxes are fed to the incinerator unopened, by means of an automatic feeding device which seals the plant environment from that of the incinerator. The waste is combusted in the lower chamber of the incinerator for a desired period of time at controlled temperatures with heat supplied by burning the waste and by combustion of gas or other fuel as needed. After initial combustion the flue gases and entrained waste particulates are further combusted in a second chamber with a retention time of a few seconds at a temperature of about 950° C. All material remaining from the initial combustion process is fed directly into a glass melting furnace.

In one embodiment the exhaust of the upper chamber of the incinerator is directed to a Venturi cyclone separator burner. The cyclone efficiently removes fly ash from the exhaust stream and ensures that all pathogens are destroyed by a high temperature burn. The hot fly ash collected by the cyclone is fed to the melt furnace as needed using a screw feeder or other conveyance. If necessary the fly ash can be collected and cooled for storage and later feeding to the melter.

The exhaust is then processed through a dry or wet scrubber and filter system to neutralize acids due primarily to the combustion of plastics and prevent the release of any hazardous emissions. The scrubber is followed by HEPA filters which remove any particulates not recovered by the cyclone. When the filters become loaded they are fed to the incinerator and thus do not contribute to a second waste stream. Under normal operation the hot bottom ash is conveyed from the ash pit by an ash conveyor to the melter as needed. If necessary the ash can be cooled and stored for later feeding to the melter.

The electric joule heated furnace having a curtain of bubbles rising through a glass melt permits introduction of the ash into the glass melter without having to premix the ash with other glass raw materials or having to calcine the ash to combust remaining carbon. Both streams are fed into the glass melter and eventually become incorporated in the glass product.

The remaining stack gases, which are dust-free after passing through the Venturi device but still contain pollutants such as nitrogen, sulfur dioxide and chlorine, are passed through a water spray scrubber, then through a high efficiency mist eliminator (HEME), and finally through high efficiency particulate absolute filters (HEPA filters).

The glass melter according to the present invention is a special furnace capable of processing large quantities of ash through effective control of its internal chemistry. Even though the ash may containing 5–10% carbon, the ash is fed to the glass furnace as part of a non-mixed batch. The non-mixed batch is processed through a combination of melt stirring, maintenance of highly oxidizing conditions, and high temperature. The medical waste residues from the combustion unit are added to the center of the melter, which is maintained under highly oxidizing conditions. This ensures the oxidation of all remaining metal residues as well as carbonaceous material. Both stirring and the maintenance of highly oxidizing conditions are accomplished by means of passing a continuous stream of air or oxygen bubbles through the melter.

Glass formers, such as glass frit, silica, for instance in the form of sand, or fluxes, such as alkali oxides and alkaline earth oxide or carbonates, cullet or boron trioxide, or any combinations thereof, are added to the glass melt of the furnace to permit the production of silicate glass by melting at a temperature between about 900° C. and about 1250° C., preferably between about 1000° C. and about 1250° C., most preferably between about 1100° C. and about 1250° C. Such melt temperatures can be achieved using electric heating.

The furnace will thereby convert the residues of medical waste combustion into non-toxic glass. Any crystalline material which will exist at the melt temperature will become completely encapsulated in the glass.

The furnace will thereby convert ACM, infectious waste, toxic materials and radioactive waste into vitrified non-toxic glass ceramic. The furnace will have at least two, preferably three, exits or outlets. During normal operation the glass will be drawn off through an exit below the melt surface level. The exits include a bottom drain, a top drain and an air lift exit serving as the primary removal source.

In one embodiment of the invention a pipe close to the bottom of the melt tank is a bottom drain outlet. An air lift exit taps the most homogeneous part of the melt, thus producing the best glass. It is preferable that the air lift exit be located above the bottom drain outlet to allow the accumulation on the bottom of the furnace of undissolved material with a higher density than the molten glass. Periodically the debris at the bottom of the furnace is emptied by use of the bottom drain outlet. Pieces of metal (e.g., iron, lead) that may be thick enough that they do not oxidize completely upon falling through the melt pool may still be oxidized by the convection currents formed in the melt. The debris that still accumulates at the bottom of the furnace can be drained through the bottom drain outlet.

The glass drawn off either through an exit such as an air lift, an overflow outlet, or a suction outlet, or the bottom drain outlet, or both, is connected with a marble making machine for shaping and quenching of glass into at least two sizes of approximate spheres where the smaller spheres have a diameter from less than half to one-third of the large spheres. The spheres are cooled sufficiently fast to be thermally tempered and have a surface compressive strength level above about 3000 psi, preferably about 5000 psi, and most preferably above about 7000 psi.

The glass spheres may be used as a fill material, for instance, in concrete in construction, composed of at least two sizes of approximately spherically shaped glass balls made of high magnesium silicate glass (wt% $MgO > 10\%$) having a surface compressive thermal stress higher than 5000 psi, and a ratio of diameter higher than about 2.

When used as a filling material, if spheres of the same size are used, only about 60% of the space is filled. The holes left after filling with one size spheres are too small to put the same size sphere in, however, small spheres easily fit. Thus if spheres are used having a diameter less than about half the first sized sphere the interstitial spaces are filled. This result is improved by using even smaller spheres.

By a fast symmetric cooling of the glass spheres, the outer surface of the spheres goes into compression while the center will have an equal and opposite tension. Since glass normally fails when its surface is in tension, the compressive stress introduced by the rapid cooling of the spheres must be overcome before failure.

Typically, a glass composition of MgO of 5–25%, $SiO_2$ of 30–50%, $Na_2O$ of 10–30%, CaO of 5–20%, and $Fe_2O_3$ of 5–15%, will be obtained with a preferred composition of MgO of 10–20%, $SiO_2$ of 35–45%, $Na_2O$ of 10–25%, CaO of 5–15%, and $Fe_2O_3$ of 5–5%.

It is an object of the present invention to vitrify material such as waste, which may include asbestos containing materials, ash of infectious waste, toxic materials or radioactive materials, or of other glass-forming materials, into glass by heating a glass melt in a Joule-heated furnace, generating a curtain of glass bubbles in the glass melt, supplying the waste or other glass-forming materials to the glass melt and withdrawing molten glass from the furnace at a temperature of at least 900° C.

It is another object of the present invention to vitrify asbestos containing waste materials which include ferrous metals by heating a glass melt in a furnace under oxidizing conditions by maintaining the melt at a temperature of about 1050°–1250° C., supplying asbestos containing waste materials which include ferrous metals so as to substantially oxidize the ferrous metals so that the ratio of $Fe^{++}$ to total oxidized iron is less than 0.1, and withdrawing molten glass from the furnace at a temperature of at least 900° C.

It is yet another object of the present invention to convert waste, such as asbestos-containing materials, ash of infectious medical waste, toxic materials or radioactive waste into a glass by heating a glass melt in a furnace, supplying waste materials to the furnace, withdrawing molten glass from the furnace at a temperature of at least 900° C., and shaping the withdrawn molten glass in spherical shape having at least two sizes.

It is still yet another object of the present invention to vitrify waste materials which include sulfates by heating a glass melt in a furnace having a melt outlet adjacent the bottom of the furnace and a skimmer outlet adjacent the top of the melt, supplying waste materials which include sulfates to the furnace so that the sulfates accumulate on the surface of the melt, periodically discontinuing the supply of waste material to the furnace, removing the accumulated sulfate from the surface of the melt and withdrawing molten glass from the furnace at a temperature of at least 900° C.

It is still yet another object of the present invention to vitrify waste, such as asbestos-containing materials, ash of infectious waste, toxic materials or radioactive waste, into a glass by heating a glass melt within a furnace, supplying waste in containers to the furnace, and withdrawing molten glass from the furnace at a temperature of at least 900° C.

It is another object of the present invention to produce a fill material of at least two sizes of spherically shaped magnesium silicate glass, the glass having an MgO content in weight percent greater than 10%, the glass having a surface compressive thermal stress higher than about 5000 psi, and the glass having a ratio of mean diameters greater than 2.

A further object of the present invention is the complete destruction of all pathogens in the bottom ash which often results from incomplete combustion of medical wastes with immobilization of toxic metal contaminants, such as chromates, and prevention of their leaching into the environment by conversion of incinerator ash of infectious medical waste into a useful product.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
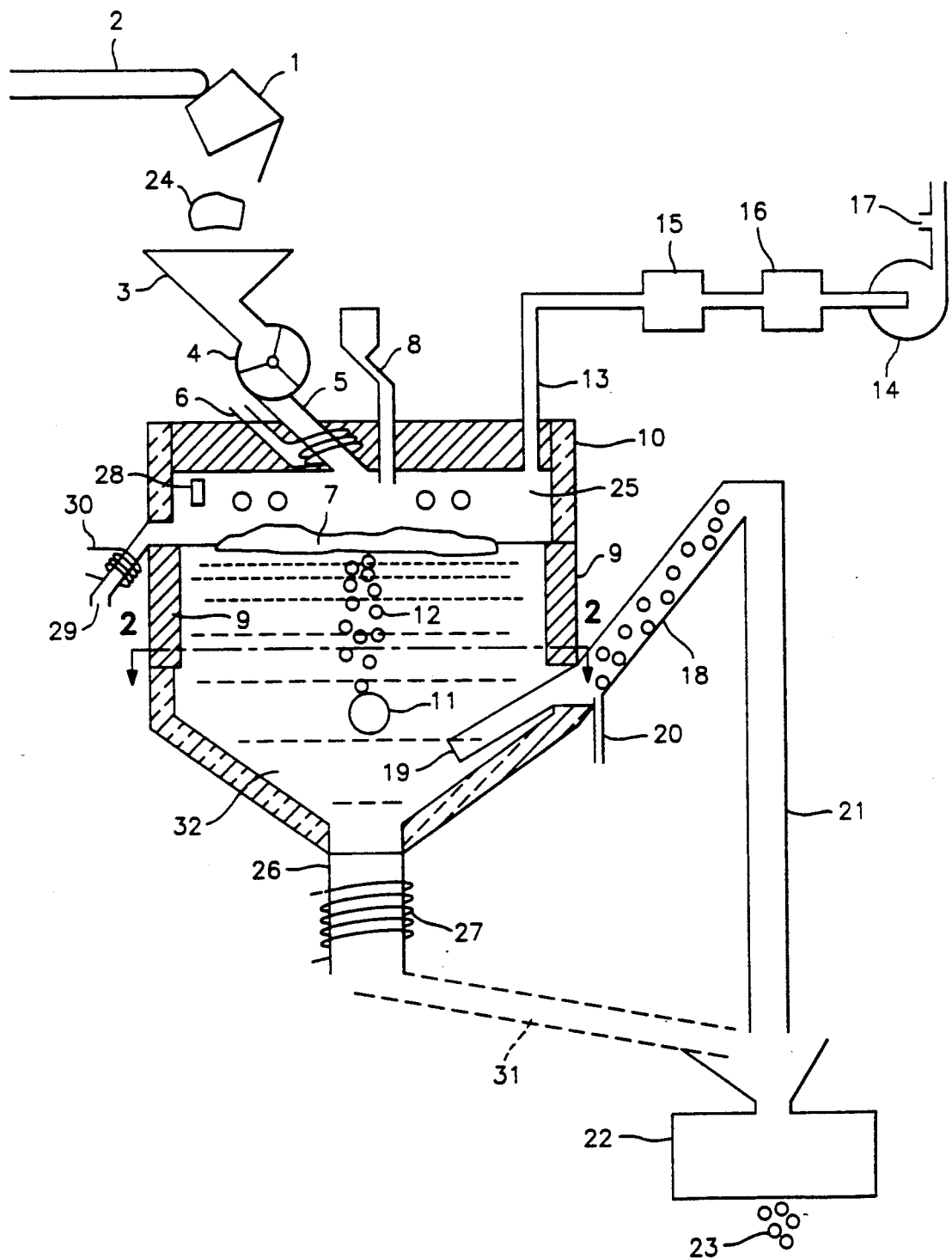
FIG. 1 is a schematic view of a container delivery system to a glass melt furnace having outlets and a marble making apparatus.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
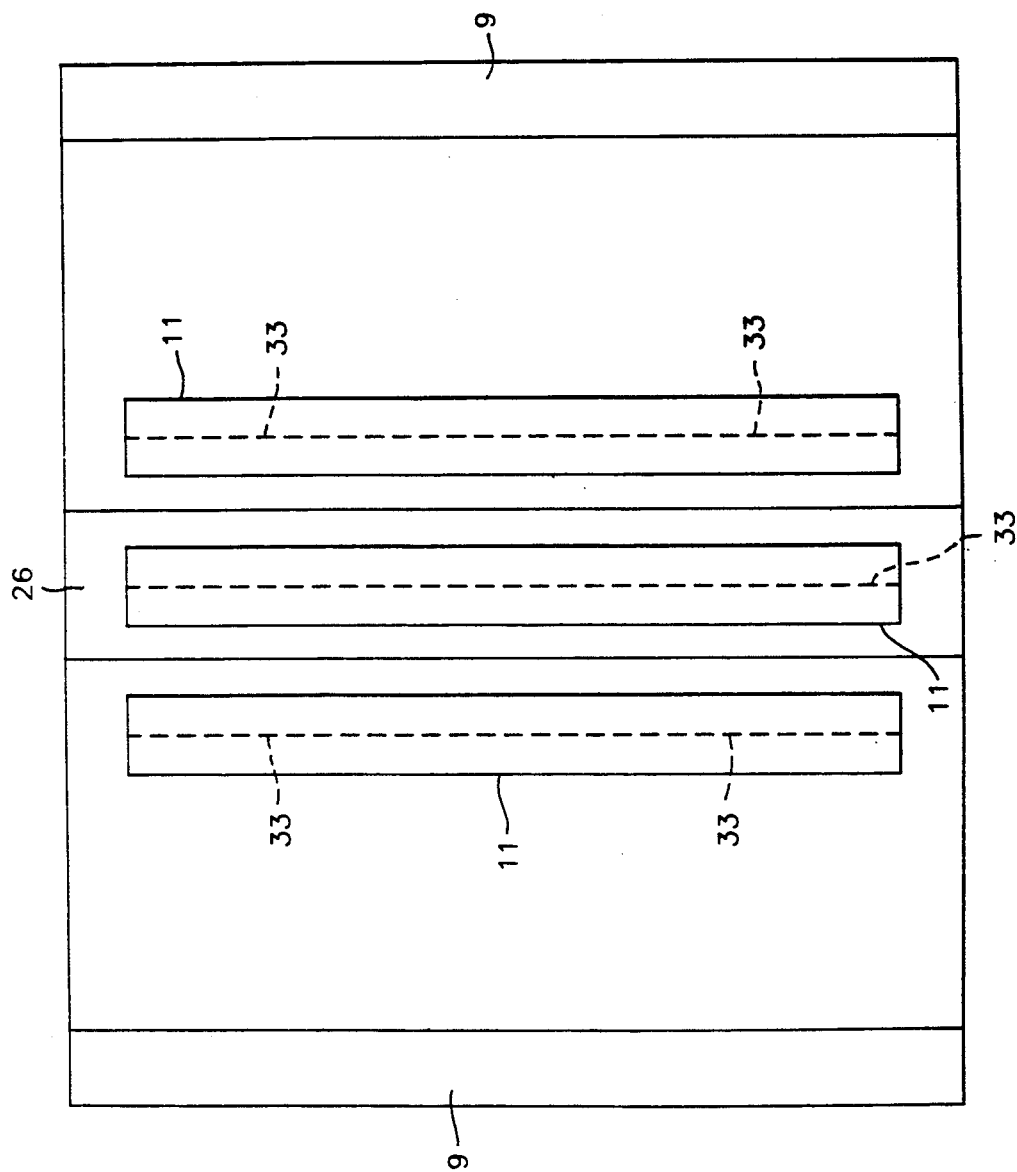
FIG. 2 is a cross-sectional view of an alternate embodiment taken along line 2—2 of FIG. 1.

With reference to the drawings, in general, and to FIGS. 1 and 2, in particular, a process for vitrifying waste, such as asbestos waste material, toxic materials or radioactive waste is generally shown.

Typically, ACM consisting primarily of fibrous pipe or other insulation but containing some wire reinforcement, other metal objects, plastic and other abatement related debris, typically dampened with water to reduce dusting, is contained in plastic bags 24, typically having one plastic bag contained within another plastic bag. The bags are delivered by closed truck to the vitrification site. For worker safety and for low cost operations the bags are never opened outside the furnace. The bags are off-loaded from the truck into conveyor-born hoppers or containers 1 with lid closures. Each hopper can hold one or more bags. The hoppers are conveyed to a storage area where they are stored until needed in a warehouse area which is preferably largely automated.

It is understood that similar containerizing of toxic waste materials or radioactive waste is implemented for transfer by hoppers 1. Alternatively, the toxic materials or radioactive waste is loaded directly in the hoppers 1 without containerization.

When needed, a hopper 1 is automatically conveyed by conveyance 2 to the furnace and its bag 24, or contents, is automatically discharged to the furnace input chute 3. The input chute is equipped with a sealed means 4 at subambient pressure for sweeping the bags into the input chute 5 of the furnace. The input chute is water cooled at 6 by circulating water to prevent the bags or contents from melting and sticking. The bags fall onto the top surface of the glass melt.

The furnace has a charge of glass 32 from previous operations and has a relatively cool "cold cap" 7 consisting of unmelted ACM or waste materials and melt accelerator. Melt accelerator consisting primarily of NaOH solution is dispensed onto the surface of the cold cap as needed by a dispensing means 8.

The melt is heated by the Joule heating effect. Flat rectangular high-nickel chrome electrodes 9 such as INCONEL electrodes are in two opposing walls of the furnace and current passes between them and through the melt. It is understood that more than two electrodes may be used with a different configured furnace such as a triangular furnace, using three electrodes, etc.

Sufficient current is passed through the melt to maintain the average temperature near 1150° C. The walls of the furnace 10 are a high chrome brick which is resistive to attack from the glass at or below the melt temperatures employed.

A horizontal pipe 11 perforated with a multitude of holes is positioned near the bottom of the furnace with its length extending parallel to the planes of the electrodes and approximately equidistant from each electrode. A curtain of air bubbles 12 is created by forcing air or oxygen out of the pipe. The bubble containing region 12 of glass generates a proportionately larger amount of heat due to its higher resistance relative to non-bubble containing regions.

Due to the rising bubbles and the hotter glass surrounding the bubbles there is a rising plume of agitated hot glass in the center of the melt. This hot plume of glass attacks the base of the cold cap and promotes rapid oxidation, dissolution, and incorporation of the unmelted material in the melt. As the waste is heated and agitated by the hot plume of glass the plastic bags or containers, and any other organic material burn, aided by the air bubbled through the melt.

Metal objects in the waste are largely oxidized by the air as it is heated by the hot glass. The oxidized material dissolves in the melt except for some large pieces which are of sufficient size to sink through the melt without being completely reacted. These pieces slowly collect at the furnace bottom. The moisture and any decomposition gas products from the waste are exhausted by the furnace vent 13 which maintains the furnace at a slight negative pressure relative to ambient via a blower 14.

The exhaust gases are cleaned by scrubber 15 and filter 16 to render them environmentally acceptable.

Monitor 17 insures that the exhaust meets the required standards.

The normal discharge of melted waste is controlled by an air lift 18. The inlet 19 of the air lift is below the level of the horizontal pipe 11 and well separated from it. The air lift operates by controlling the effective density of the glass in the air lift by introducing bubbles into the air lift pipe by an air pipe 20. This creates an effective head pressure which forces the glass up the air lift and out of the furnace.

The discharge pipe 21 of the furnace provides the feed to a marble making machine 22. This machine cuts defined size gobs of glass and shapes them by well known means into at least two different size marbles 23 and discharges the marbles to a collection bin (not shown).

Periodically the unmelted debris collected at the furnace bottom is drained. Before draining, the waste feed to the furnace is stopped and the top heaters 25 in the furnace are turned on until the minimum temperature in the melt is greater than about 1000° C. The furnace is then allowed to equilibrate for 4 hours to insure that all waste in the melt has been destroyed. The bottom drain 26 of the furnace is then permitted to warm sufficiently to drain at a controlled rate by reducing the cooling in the freeze coils 27. The glass is allowed to drain until it is relatively free of debris. The glass and unmelted debris is quenched and disposed of. After draining the top heaters 25 are turned off, the freeze coils 27 are turned on and normal operations are begun again.

In an alternate mode of operation after the bottom drain 26 has been cleared of debris the output can be diverted to the alternate withdrawal chute 31 and to the marble making machine 22.

Periodically or when there are unusually large quantities of gypsum in the case of ACM it is necessary to skim the top of the furnace. When the detector 28 indicates that a large quantity of material is building up on the cold cap, feeding of waste is stopped. The top heaters 25 of the furnace are turned on and the surface temperature of the melt is raised to about 1000° C. and held for at least about one hour, and preferably for 4 hours to destroy wastes such as the asbestos fibers in the cold cap. The top drain 29 of the furnace is then allowed to warm by reducing the cooling in the freeze coils 30. The glass is allowed to drain until the surface material has been largely removed. The glass and unmelted debris is quenched and disposed of.

In FIG. 2, an alternate embodiment of the invention is shown. In FIG. 2, three horizontal pipes 11 are shown located between the opposed electrodes 9. Each of the horizontal pipes is perforated with a multitude of holes 33 for release of a curtain of air bubbles created by forcing air out of the pipes 11. By the use of three horizontal pipes 11, three air curtains are created to create a turbulent force within the glass melt and for increasing the heat of the melt.

Figure 3:
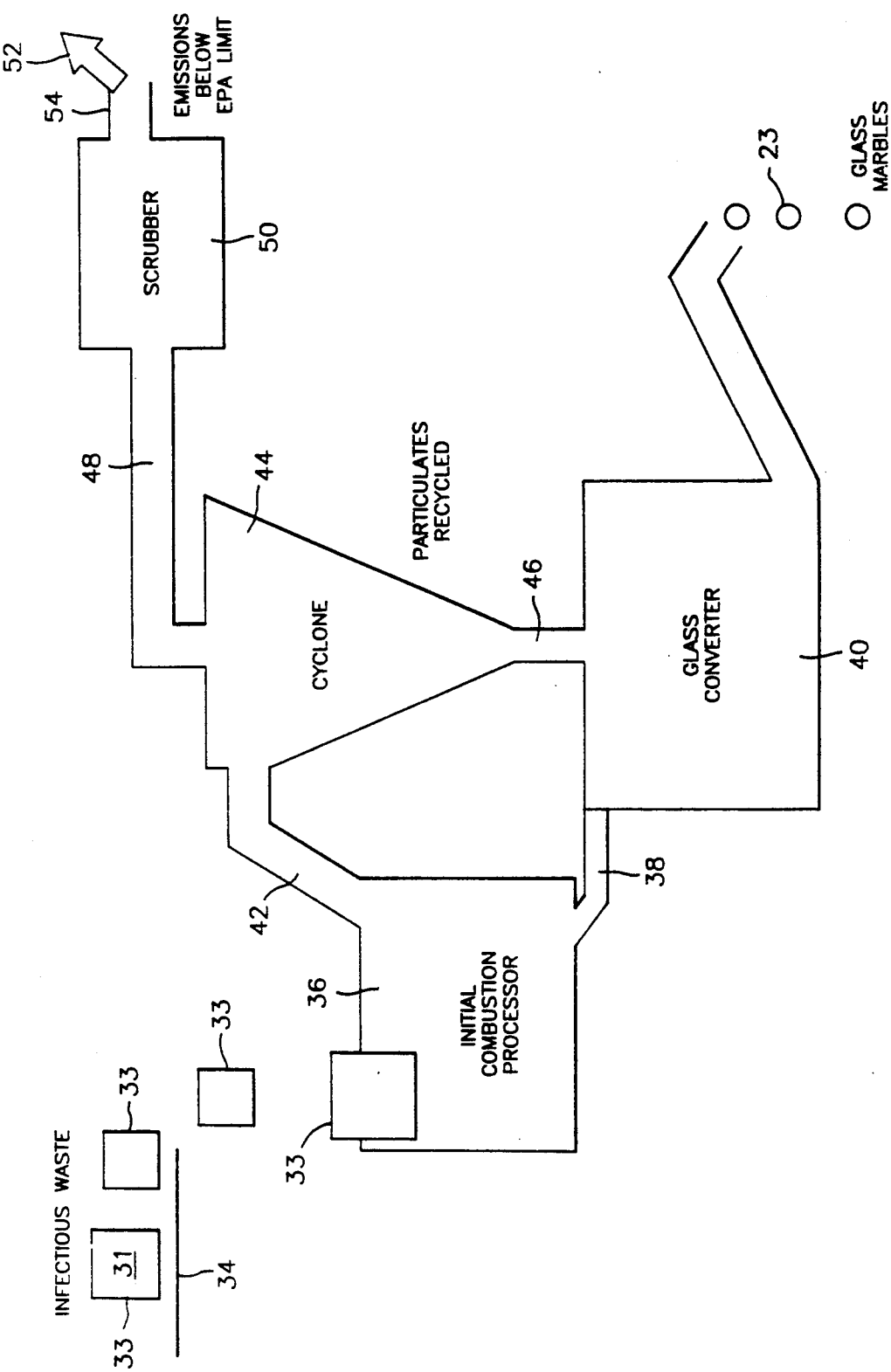
FIG. 3 is a schematic view of a process for vitrifying infectious waste.

In FIG. 3, infectious medical waste 31, sealed in cardboard boxes 33, is transferred by a conveyor 34 to an initial combustion processor or incinerator 36. Bottom ash of incinerator 36 is transferred by chute 38 to glass melt furnace 40. Glass melt furnace 40 is equivalent to the furnace shown in FIG. 1 and conveyance chute 38 would lead to chute 3 of FIG. 1 for the processing of ash by the glass furnace 40. Fly ash generated by the incinerator 36 is transferred by duct 42 into a heated cyclone separator 44. Particles of ash processed by the cyclone separator are transferred by chute 46 into the glass furnace 40 along with bottom ash transferred through chute 38 from incinerator 36. Gases and fine particles passing up through the cyclone separator 44 are transferred by duct 48 to a scrubber unit 50 which only allows passage of emissions, as represented by arrow 52, through duct 54 at an emissions level below accepted EPA limits.

The vitrified ash deposited into furnace 40 is drawn off from the bottom of the furnace and processed into glass marbles 23. The drawing off of glass and processing of gases from the furnace 40 is the same as is described in greater detail for the furnace shown in FIG. 1.

In FIG. 1, the feed to the furnace or melter rather than including hoppers 1 and bags 24, in the case of medical waste vitrification, consists of bottom and fly ash from an incinerator, glass formers and additives. The waste streams are fed to the melter either separately or after mixing and can be fed directly from the incinerator for energy efficiency as shown in FIG. 3 or after cooling and/or storage. The feed can also include ash from off site incinerators in which case ash from the incineration of medical "red bag" waste consisting of bottom ash and of fly ash is delivered to the glass plant by truck. The trucks are unloaded into storage bins. As needed, the ash is conveyed to a conventional mixer where glass formers are added as needed and the batch is mixed. The mixed ash and glass formers are fed into the melter by means of a screw feeder or other sealed conveyor means. Alternately, the ash is fed directly into the furnace with separate entry of the glass batch materials.

Figure 4:
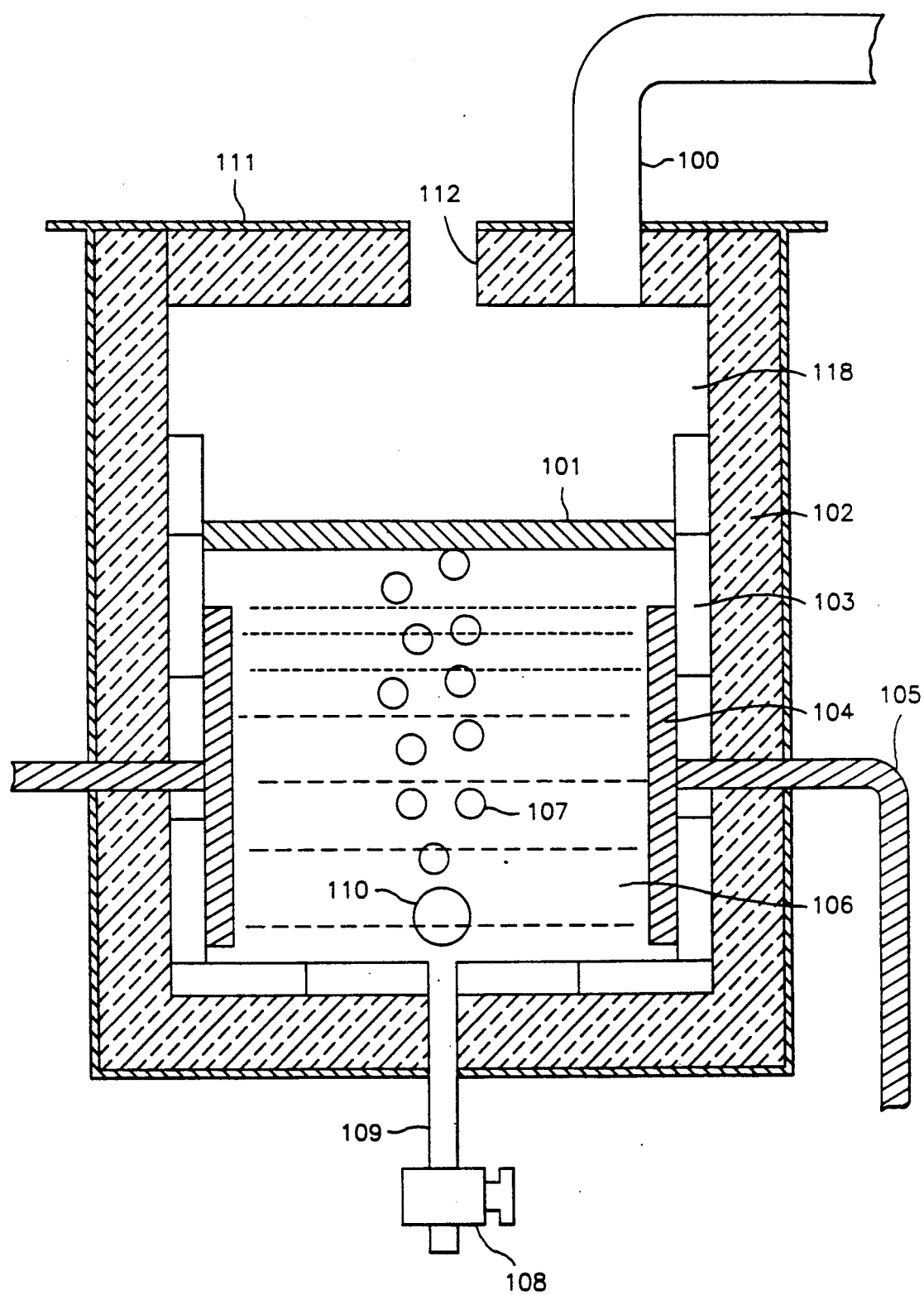
FIG. 4 is a side sectional view of a small scale electric melter.
Figure 5:
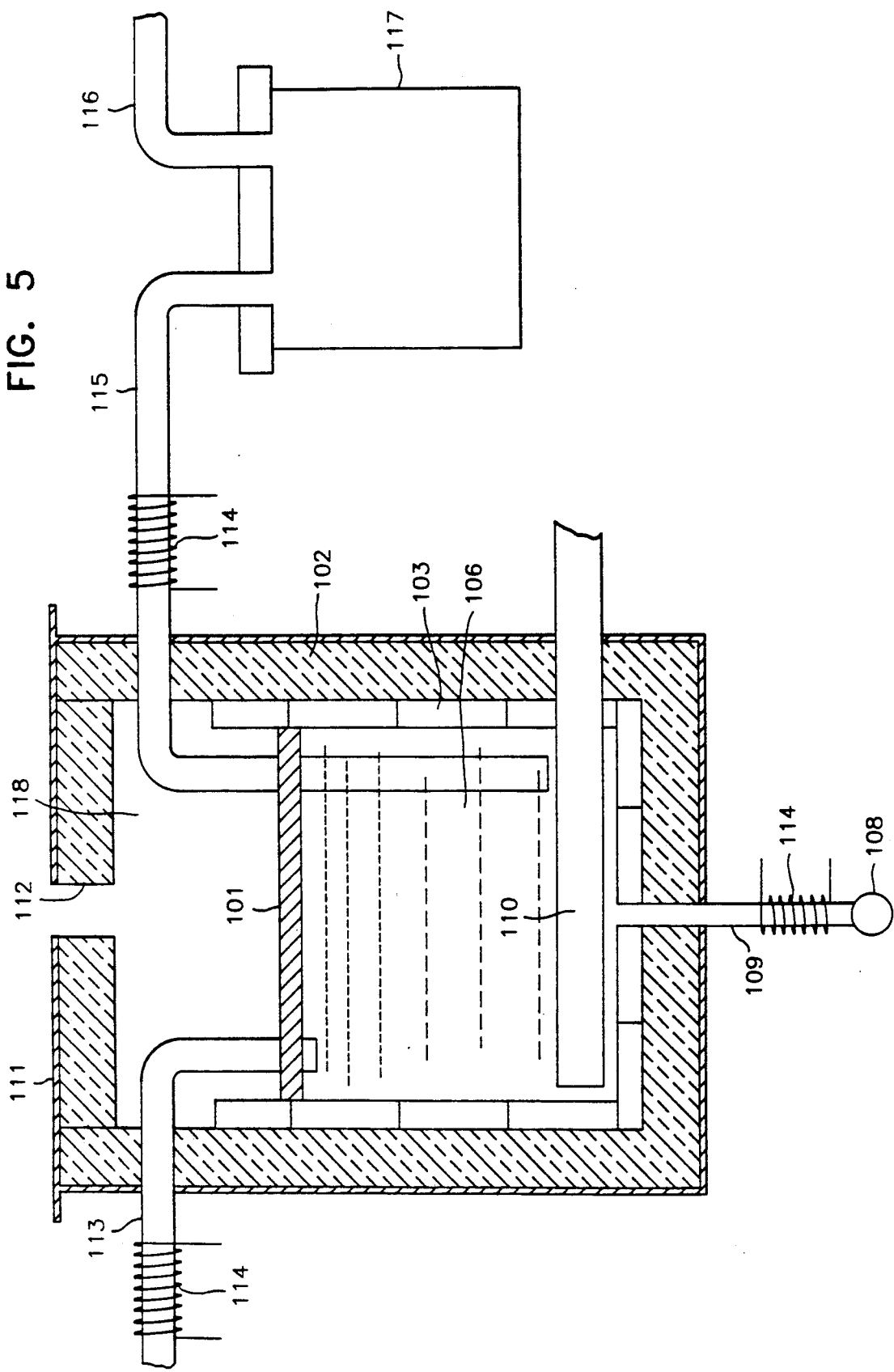
FIG. 5 is an end sectional view of the small scale electric melter shown in FIG. 4.

FIGS. 4 and 5 are side and end sectional views, respectively, which illustrate a small scale electric melter used to demonstrate several aspects of the present invention. The melter has a square surface area approximately 15 cm on a side. In normal operation the glass depth is 15 cm.

The glass tank is constructed of refractory brick 103 which is backed by alumina castable refractory (not shown) within a stainless steel tank (not shown). The tank is surrounded by refractory fiber board insulation 102. The outer shell 111 of the melter is sheet steel.

The melter has two flat plate INCONEL electrodes 104 approximately 14.5 cm wide and 10 cm high. Each is connected to an electric supply (not shown) via its buss 105 which passes through the brick 103, castable refractory (not shown), stainless steel tank (not shown), fiber board insulation 102 and outer shell 111. The buss 105 is electrically insulated from the tank and shell by castable refractory (not shown). The height of the upper edges of the electrodes 104 are 14 cm above the bottom of the glass tank.

An INCONEL bubbling tube with a multitude of holes along its length is positioned near the bottom of the tank, along a center line between the electrodes 104. The bubbling tube penetrates to the outside of the melter in a manner similar to the electrode buss bars 105 and then connects to an air supply (not shown). A bottom drain pipe 109 extends from the bottom of the tank and below the melter. The bottom drain pipe penetrates to the outside of the melter in a manner similar to the buss bars 105. The end of the drain pipe is fitted with a slide valve 108.

A glass suction tube 115 penetrates the wall of the melter above the bricks 103 and extends downward into the molten glass 106, ending about −2 cm from the bottom of the tank. The tube is fitted with an electric heater 114 along the horizontal portion extending out of the melter. The tube is connected to a sealed canister 117 which can be evacuated through vacuum port 116 which is connected to a vacuum pump (not shown).

A gall layer suction tube 11 penetrates the wall of the melter above the bricks 103 in a manner similar to the glass suction tube 115, however, the gall layer suction tube extends downward, ending at a height approximately 1.3 cm above the height of the upper edges of the electrodes 104. The gall layer suction tube 113 is connected to an evacuable canister (not shown) in a similar manner as the glass suction tube 115.

The plenum space 118 above the melt is heated with a silicon carbide resistance radiant roof heater (not shown). The roof of the melter has an exhaust 100 and a port 112. The port may be opened for viewing the melt surface and for feeding material to the melter or it may be closed with a plug (not shown).

The melter is started by heating waste glass material in the glass tank by use of the roof heater. After the temperature of the glass 106 reaches 600° to 700° C., depending on its conductivity, voltage is applied to the electrodes and Joule heating of the glass 106 will proceed at an accelerating rate as the temperature and electrical conductivity of the glass increases. The normal design operating temperature for the melter is about 1150° C.

By applying air pressure to the bubbling tube 110 bubbles 107 are released. Changes then occur in the current passing between the electrodes at constant applied voltage demonstrating the change of the resistivity of the current path through the melt. Material is added to the melter through the port 112 until a desired glass level is reached.

When it is desired to withdraw glass, the glass suction tube 115 is heated with the resistance heater 114 and vacuum is applied to the canister 117 through the vacuum port 116. The differential pressure forces glass into the canister until the vacuum is stopped or the canister is filled. If a gall layer 101 develops on the top of the glass or one is intentionally introduced it may be withdrawn using the gall layer suction tube 113 in a manner similar to the operation of the glass suction tube 115.

An alternate method of draining glass from the melter is to use the bottom drain 109. To operate it, the slide valve 108 is opened and the drain 109 is heated until glass 106 flows. The flow can be stopped or adjusted using the slide valve 108 and allowing the drain to cool. The bottom drain 109 can be used to essentially drain the melter of all glass 106.

In one example the above described melter was used to heat a melt with cullet having chromium in it added to the melt to simulate the addition of ACM, toxic materials, radioactive waste, or medical waste, for example, with the resultant melt having the following major components:

| Component | Weight % |
|---|---|
| $SiO_2$ | 41 |
| $B_2O_3$ | 13 |
| $Na_2O_3$ | 11 |
| $Fe_2O_3$ | 12 |
| $K_2O$ | 3 |
| $Li_2O$ | 3 |
| $ZrO_2$ | 3 |
| $Al_2O_3$ | 2 |
| $P_2O_5$ | 2 |

| Component | Weight % |
|---|---|
| MgO | 1 |
| $MnO_2$ | 1 |
| remainder | 8 |

The remainder consisted of various amounts of metal oxides, rare earth oxides, alkali and alkaline earth oxides, chromium oxides and transition metal oxides.

The melter was filled to a depth of about 10 cm with a mixture of cullet and borax yielding the above nominal composition. The melter was heated to approximately 660° C. using a silicon carbide resistance heater (not shown) in the plenum space 118 of the melter. The temperature was measured by a thermocouple in the molten glass (not shown). At that temperature the glass cullet softened and combined with the borax. A voltage was then applied to the electrodes. The maximum voltage available was approximately 40 volts. The initial current passing through the glass was about 2.5 amperes.

As the temperature of the glass increased, the conductivity and current increased and the rate of temperature rise accelerated. The power to the electrodes was controlled using a temperature controller (not shown) having a current limited output. At the lower temperatures the resistance of the melt was high and so the voltage output was always the maximum. Air pressure was applied to the bubbler tube 110 at all times to ensure that the tube did not fill with glass and clog.

When the glass 106 was molten, bubbles were seen slowly rising and breaking at the surface of the melt. When the temperature reached about 700° C. the bubbles appeared to coalesce below the surface and break the surface as a single large bubble near the center of the melt surface. The current was observed to fluctuate at constant applied voltage as the bubbles passed toward the surface and altered the resistance path between the electrodes 104.

The temperature of the glass was increased to 1150° C. and controlled by the temperature controller. At this temperature the bubbling rate could be easily controlled to yield single or multiple areas where coalesced bubbles about 5 cm or more in diameter broke the surface. The steady state current at this temperature was about 100 amperes at about 15 volts.

Cullet and borax were added to the melt until the electrodes 104 were covered. After the glass 106 had been allowed to homogenize for a short time a small sample was withdrawn from the melter using the glass suction tube 115.

The tube heater 114 was used to heat the tube 115 to about 1000° C. measured by a thermocouple (not shown) extending about 8 cm inside the melter wall. A vacuum was applied to the vacuum port 116 and immediately a small amount of glass was drawn into the canister 117. The flow was stopped when the glass was allowed to freeze in the tube. At that point additional cullet and borax were added to the melt to raise the glass level to that of the end of the gall removal tube 113. Then 400 gm of sodium sulfate powder was added to the melter to produce a gall layer 101 about 6 mm thick. The conductivity of the gall layer was much higher than the glass. The current limit of the controller was reached at a relatively low voltage.

The temperature in the glass began to drop because a large portion of the current was passing through the gall layer and not the glass and a lower power level was provided by the electrodes in the glass. The current limit was adjusted upward from about 75 amperes to 135 amperes at 21 volts and the glass temperature began to rise very slowly. The bubbling rate in the melter was zero at this time.

The bubbling rate was then increased to a rate of approximately 120 bubbles per minute. The current remained at 135 amperes but the voltage increased to 24 volts. The bubbling appeared to disrupt the gall layer preventing it from shorting between the electrodes. The resistance between the electrodes was effectively increased.

At this time the temperature in the glass began to increase rapidly and reached the setpoint of 1150° C., rising 50° C. in about 5 minutes. This showed that the harmful effect of shorting due to a gall layer could be overcome by bubbling and that bubbling was able to increase the resistance of the melt and increase the power available to heat the glass at a constant supplied current.

The gall layer removal tube 113 was heated to about 950° C. using its resistance heater 114. The temperature was measured with a thermocouple (not shown) near the external wall of the melter. The point of connection between the tube and the canister was heated using two propane torches to raise the temperature of that area to about 470° C. Vacuum was then applied to the canister via the vacuum port (these were similar to that of the glass suction tube but are not shown in FIG. 4).

The gall layer was immediately drawn into the canister until the level in the melter dropped below the end of the gall suction tube. A small sample of the glass taken at this time from the surface of the melt was black and shiny upon cooling indicating that there was no substantial sulfate phase remaining. Further the weight of material collected in the canister was about 394 gm which is near that of the added sodium sulfate gall layer.

The shorting effect between the electrodes was no longer present as evidenced by the fact that the glass temperature could be maintained without rapid bubbling in the melt to disrupt the surface. It was thus demonstrated that the gall layer and its effects could be easily and substantially removed when desired.

Having described the invention, many modifications thereto will become apparent to those skilled in the art to which it pertains without deviation from the spirit of the invention as defined by the scope of the appended claims.

We claim:

1. A process for vitrifying materials into a silicate, comprising:
    heating a silicate melt within an electrical glass melting furnace by passing an electric current through the melt between at least two electrodes so as to maintain the melt at a temperature above the decomposition temperature of the materials;
    generating a curtain of gas bubbles in the melt across a substantial portion of the current path between the at least two electrodes to increase the power density of the melt in the region of the curtain of gas bubbles;
    supplying materials to the furnace above the melt so that the materials fall onto the melt and the materials are melted to silicate; and
    withdrawing molten silicate from the furnace at a temperature of at least 900° C.

2. The process of claim 1, and further comprising shaping the withdrawn molten silicate into spherical shape having at least two sizes in which the diameter of the smaller spheres is less than half the diameter of the larger spheres.

3. The process of claim 1, in which the furnace includes a drain outlet to periodically remove melted debris which accumulates on the bottom of the furnace.

4. The process of claim 1, in which the molten silicate is withdrawn from the furnace through a melt outlet adjacent the bottom of the furnace, the melt outlet being connected to an airlift conduit in which gas bubbles are introduced to create an effective head pressure to force the melt up the airlift and out of the furnace.

5. The process of claim 1, in which the region defined by the curtain of gas bubbles has a volume fraction of gas ranging from 10–60%.

6. The process of claim 5, in which the region defined by the curtain of gas bubbles has a volume fraction of gas ranging from 15–40%.

7. The process of claim 6, in which the region defined by the curtain of gas bubbles has a volume fraction of gas ranging from 20–30%.

8. The process of claim 1, in which the gas is air.

9. The process of claim 8, in which the gas is preheated air.

10. The process of claim 1, in which the gas is oxygen.

11. The process of claim 1, in which the curtain of gas bubbles is approximately equidistant from the at least two electrodes.

12. The process of claim 1, in which the curtain of gas bubbles is generated in the melt below the at least two electrodes.

13. The process of claim 1, in which a plurality of curtains of gas bubbles are generated in the melt.

14. The process of claim 1, in which the molten silicate is withdrawn from the furnace at a temperature above 1000° C.

15. The process of claim 1, wherein the materials include asbestos containing material.

16. The process of claim 1, wherein the materials include infectious waste.

17. The process of claim 1, wherein the materials include toxic materials.

18. The process of claim 1, wherein the materials include low level radioactive waste.

19. The process of claim 15, in which the asbestos containing materials are supplied to the furnace in closed plastic bags.

20. The process of claim 15, in which the asbestos containing materials include gypsum and further comprising periodically discontinuing the supply of materials to the furnace once the gypsum is dehydrated to calcium sulfate and the calcium sulfate has accumulated on the surface of the melt so that the area above the melt is heated to above about 900° C. and still further comprising removing the accumulated calcium sulfate from the surface of the melt.

21. The process of claim 15, in which the asbestos containing materials include ferrous metals and further comprising heating the glass melt under oxidizing conditions so that the ferrous metals are substantially oxidized and the ratio of $Fe^{++}$ to total oxidized iron is less than 0.1.

22. The process of claim 1, wherein the materials are waste materials.

23. The process of claim 1, wherein a gall layer accumulates on the surface of the melt, and the generated curtain of gas bubbles disrupts conductivity of the gall layer.

24. A process for converting waste materials into a silicate, comprising:
heating a silicate melt within an electrical glass melting furnace by passing an electric current through the melt between at least two electrodes so as to maintain the melt at a temperature above the decomposition temperature of the waste materials;
supplying waste materials to the furnace above the melt so that the waste materials fall onto the melt and the waste materials are melted to silicate;
withdrawing molten silicate from the furnace at a temperature of at least 900° C.; and
shaping the withdrawn molten silicate into spherical shape having at least two sizes in which the diameter of the smaller spheres is less than half the diameter of the larger spheres.

25. The process of claim 24, further comprising generating a curtain of gas bubbles across a substantial portion of the current path between the at least two electrodes to increase the power density of the melt in the region of the curtain of gas bubbles.

26. The process of claim 24, in which the molten silicate is withdrawn from the furnace through a melt outlet adjacent the bottom of the furnace, the melt outlet being connected to an airlift conduit in which gas bubbles are introduced to create an effective head pressure to force the melt up the airlift and out of the furnace.

27. The process of claim 24, in which the spherically shaped silicate is thermally tempered by cooling.

28. The process of claim 24, in which the spherically shaped silicate has a surface compressive thermal stress higher than about 5000 psi.

29. The process of claim 24, wherein the waste materials include asbestos containing material.

30. The process of claim 24, wherein the waste materials include infectious waste.

31. The process of claim 24, wherein the waste materials include toxic materials.

32. The process of claim 24, wherein the waste materials include low level radioactive waste.

33. A process for vitrifying asbestos containing waste materials comprising:
heating a silicate melt within an electrical glass melting furnace by passing an electric current through the melt between at least two electrodes so as to maintain the melt at a temperature above the decomposition temperature of asbestos, the furnace having a melt outlet and a skimmer outlet adjacent the top of the melt;
supplying asbestos containing waste materials to the furnace above the melt so that the asbestos-containing materials fall onto the melt, the asbestos is melted to a molten silicate and dehydrated calcium sulfate which accumulates on the surface of the melt;
periodically discontinuing the supply of asbestos containing waste materials to the furnace so that the area above the melt is heated to above about 900° C.;
removing the accumulated calcium sulfate from the surface of the melt through the skimmer outlet;
withdrawing molten silicate from the furnace at a temperature of at least 900° C.; and
generating a curtain of gas bubbles across a substantial portion of the current path between the at least two electrodes to increase the power density of the melt in the region of the curtain of gas bubbles.

34. The process of claim 33, in which the asbestos containing waste materials are supplied to the furnace in closed plastic bags.

35. The process of claim 33, in which the asbestos containing waste materials include ferrous metals and further comprising heating the silicate melt under oxidizing conditions so that the ferrous metals are substantially oxidized and the ratio of $Fe^{++}$ to total oxidized iron is less than 0.1.

36. The process of claim 33, and further comprising shaping the withdrawn molten silicate into spherical shape having at least two sizes in which the diameter of the smaller spheres is less than half the diameter of the larger spheres.

37. The process of claim 33, in which the furnace includes a drain outlet to periodically remove melted debris which accumulates on the bottom of the furnace.

38. The process of claim 33, in which the molten glass is withdrawn from the furnace through a melt outlet adjacent the bottom of the furnace, the melt outlet being connected to a airlift conduit in which gas bubbles are introduced to create an effective head pressure to force the melt up the airlift and out of the furnace.

39. The process of claim 33, in which the melt is maintained at a temperature of about 1100°-1200° C.

40. A process for converting waste materials onto a silicate, comprising:
heating a silicate melt with a glass melting furnace so as to maintain the melt at a temperature above the decomposition temperature of the waste materials;
supplying waste materials to the furnace above the melt so that the waste materials fall onto the melt and the waste materials are melted to silicate;
withdrawing molten silicate from the furnace at a temperature of at least 900° C.; and
shaping the withdrawn molten silicate into spherical shape having at least two sizes in which the diameter of the smaller spheres is less than half the diameter of the larger spheres.

41. The process of claim 40, in which the molten silicate is withdrawn from the furnace through a melt outlet adjacent the bottom of the furnace, the melt outlet being connected to an airlift conduit in which gas bubbles are introduced to create an effective head pressure to force the melt up the airlift and out of the furnace.

42. The process of claim 40, in which the spherically shaped silicate is thermally temperature by cooling.

43. The process of claim 40, in which the spherically shaped silicate has a surface compressive thermal stress higher than about 5000 psi.

44. The process of claim 40, wherein the waste materials include asbestos containing material.

45. The process of claim 40, wherein the waste materials include infectious waste.

46. The process of claim 40, wherein the waste materials include toxic materials.

47. The process of claim 40, wherein the waste materials include low level radioactive waste.

48. A process for vitrifying asbestos containing waste materials comprising:
heating a silicate melt within an electrical glass melting furnace by passing an electric current through the melt between at least two electrodes so as to maintain the melt at a temperature above the decomposition temperature of asbestos, the furnace having a melt outlet and a skimmer outlet adjacent the top of the melt;

supplying asbestos containing waste materials to the furnace above the melt so that the asbestos-containing materials fall onto the melt, the asbestos is melted to a molten silicate and dehydrated calcium sulfate which accumulates on the surface of the melt;

periodically discontinuing the supply of asbestos containing waste materials to the furnace so that the area above the melt is heated to above about 900° C.;

removing the accumulated calcium sulfate from the surface of the melt through the skimmer outlet;

withdrawing molten silicate from the furnace at a temperature of at least 900° C.; and withdrawing the molten glass from the furnace through a melt outlet adjacent the bottom of the furnace, the melt outlet being connected to an airlift conduit in which gas bubbles are introduced to create an effective head pressure to force the melt up the airlift and out of the furnace.

49. The process of claim 48, in which the asbestos containing waste materials are supplied to the furnace in closed plastic bags.

50. The process of claim 48, further comprising generating a curtain of gas bubbles across a substantial portion of the current path between the at least two electrodes to increase the power density of the melt in the region of the curtain of gas bubbles.

51. The process of claim 48, in which the asbestos containing waste materials include ferrous metals and further comprising heating the silicate melt under oxidizing conditions so that the ferrous metals are substantially oxidized and the ratio of $Fe^{++}$ to total oxidized iron is less than 0.1.

52. The process of claim 48, and further comprising shaping the withdrawn molten silicate into spherical shape having at least two sizes in which the diameter of the smaller spheres is less than half the diameter of the larger spheres.

53. The process of claim 48, in which the furnace includes a drain outlet to periodically remove melted debris which accumulates on the bottom of the furnace.

54. The process of claim 48, in which the area above the melt is heated to above about 1000° C. while periodically discontinuing the supply of asbestos-containing materials.

55. The process of claim 48, in which the melt is maintained at a temperature of about 1100°-1200° C.

56. The process of claim 33, in which the area above the melt is heated to above about 1000° C. while periodically discontinuing the supply of asbestos-containing materials.

* * * * *

UNITED STATES PATENT AND TRADEMARK OFFICE
CERTIFICATE OF CORRECTION

PATENT NO. : 5,188,649
DATED : February 23, 1993
INVENTOR(S) : MACEDO et al

It is certified that error appears in the above-identified patent and that said Letters Patent is hereby corrected as shown below:

Column 4, line 54, after "furnace" insert a --.-- (period);

line 63, change "(+100°C)" to --(±100°C)--.

Column 5, lines 1 and 2, please delete "$Fe^{30}+/(Fe^{++}+Fe^{++})$" and insert --$Fe^{++}/(Fe^{++} + Fe^{+++})$--.

Column 15, line 6, delete "11" and insert --113--.

Signed and Sealed this

Twenty-seventh Day of September, 1994

Attest:

BRUCE LEHMAN

Attesting Officer     Commissioner of Patents and Trademarks